United States Patent [19]

Liénart

[11] Patent Number: 4,872,626
[45] Date of Patent: Oct. 10, 1989

[54] INSULATED ANCHORING CLAMP FOR INSULATED ELECTRIC CONDUCTOR EQUIPPED WITH A CARRYING CABLE

[75] Inventor: Jean-Pierre Liénart, Isere, France

[73] Assignee: Malico S.A., Isere, France

[21] Appl. No.: 116,837

[22] Filed: Nov. 5, 1987

[30] Foreign Application Priority Data

Nov. 6, 1986 [FR] France .............................. 86 16027

[51] Int. Cl.⁴ .............................................. H02G 7/05
[52] U.S. Cl. .................................... 248/63; 248/74.5;
24/136 R; 24/115 M; 174/40 R
[58] Field of Search ................ 248/61, 63, 67.5, 74.5,
248/62, 316.2, 316.3, 328; 24/136 L, 136 R, 115
M, 503; 174/40 R, 41, 79

[56] References Cited

U.S. PATENT DOCUMENTS

| | | | |
|---|---|---|---|
| 656,993 | 8/1900 | Mossman | 24/136 R |
| 749,896 | 1/1904 | Brown | 24/136 R |
| 824,556 | 6/1906 | Lowry | 24/136 R |
| 1,401,494 | 12/1921 | Rhorer | 24/136 R |
| 2,127,115 | 8/1938 | Hamilton | 24/115 M |
| 2,817,847 | 12/1957 | Spencer | 248/328 |
| 3,952,377 | 4/1976 | Morell | 24/136 R |
| 4,509,233 | 4/1985 | Shaw | 24/115 M |

FOREIGN PATENT DOCUMENTS

| | | | |
|---|---|---|---|
| 217075 | 4/1956 | Australia | 174/79 |
| 1015087 | 9/1957 | Fed. Rep. of Germany | 24/136 R |
| 3611770 | 10/1987 | Fed. Rep. of Germany | 174/40 R |
| 2379924 | 2/1977 | France | 248/63 |
| 2379925 | 2/1977 | France . | |
| 2436509 | 9/1978 | France . | |
| 900667 | 7/1962 | United Kingdom | 174/79 |

Primary Examiner—J. Franklin Foss
Assistant Examiner—Robert A. Olson
Attorney, Agent, or Firm—Browdy and Neimark

[57] ABSTRACT

A clamp comprises a split sleeve provided with a mooring element and a conical recess with a slight slope in which a compressible core is mounted to a slide exhibiting a cavity for housing of the electric conductor or its carrying cable. The slide has an outside shape complementary to that of the recess of sleeve and which can be wedged by sliding in the latter. At least one longitudinal portion of the wall of cavity the central core, provided for housing the carrying cable of conductor and, preferably, each of the two diametrically opposite longitudinal portions of this cavity, consists of a metal bar inserted in this wall and whose free face is provided with teeth.

12 Claims, 1 Drawing Sheet

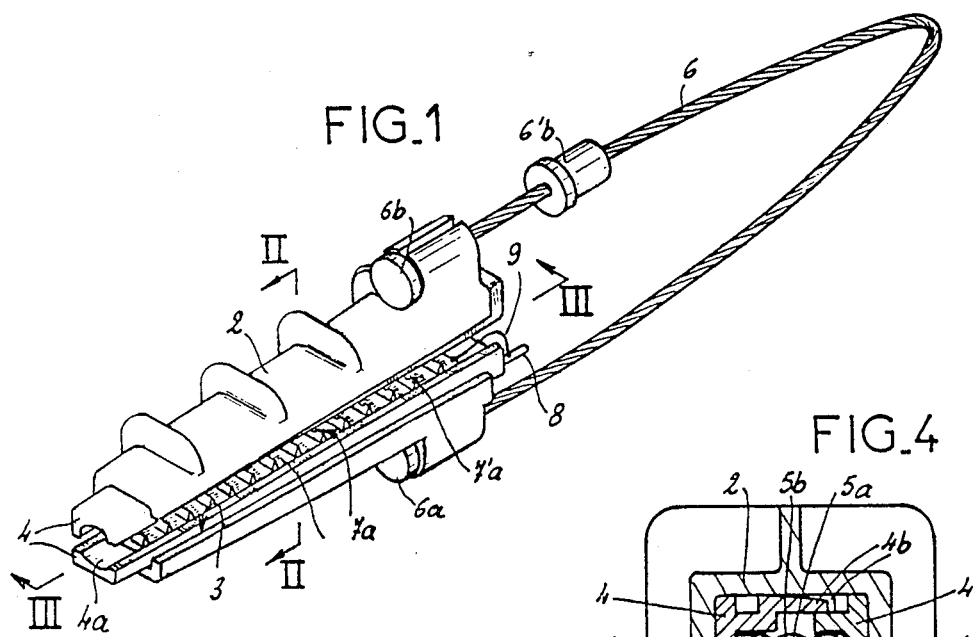
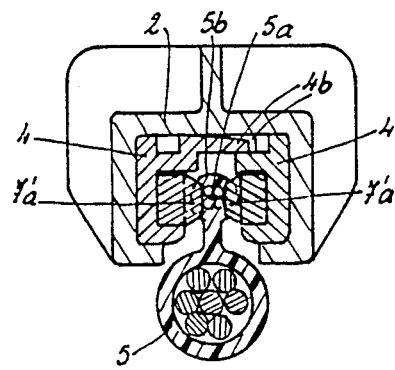
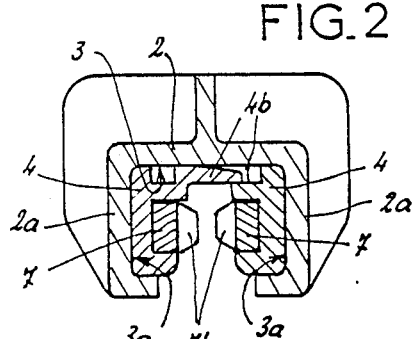
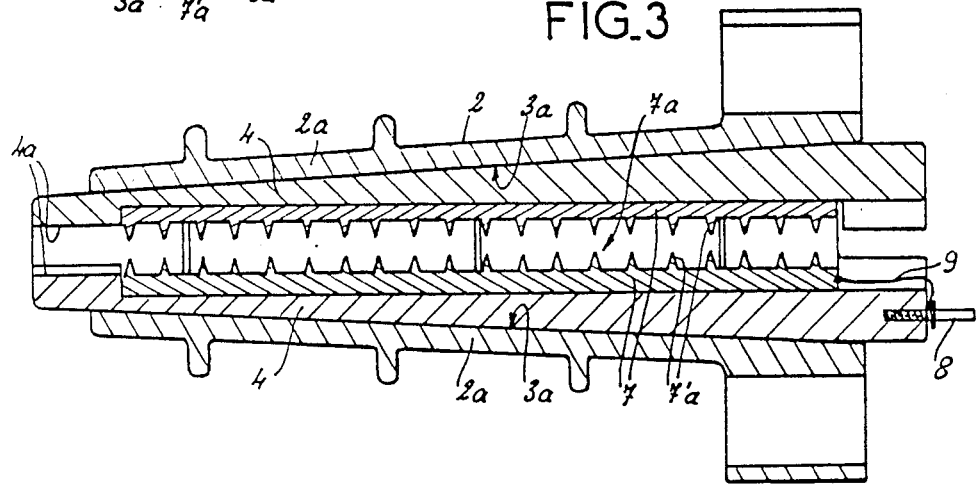

INSULATED ANCHORING CLAMP FOR INSULATED ELECTRIC CONDUCTOR EQUIPPED WITH A CARRYING CABLE

FIELD OF THE INVENTION

The invention relates to an anchoring clamp for an insulated electric conductor equipped with a carrying cable which is also insulated, more especially, the present invention relates to conductors of this type in which the thickness of the tubular insulation of the carrying cable is great relative to the cross section of the latter.

BACKGROUND OF THE INVENTION

For anchoring of conductors of said type, generally anchoring clamps are used of the type which consist of a split sleeve equipped with a mooring element and a conical recess with a slight slope in which a compressible core is mounted to a slide, having a cavity for housing of the electric conductor or its carrying cable, having an outside shape complementary to that of the recess of the sleeve and able to be wedged by sliding in the latter.

In a known anchoring clamp of this type, the sleeve has an approximately U-shaped cross-section, its recess being prismatic with a slight longitudinal slope and rectangular cross section, while the compressible core is made up of two prismatic elements or jaws forming wedges, with a slope complementary to that of the recess of the sleeve and each of which exhibits, in its face turned toward the other, a notched indentation corresponding approximately to half the cavity provided for the conductor or its carrying cable. Unfortunately, when the conductors are subjected to great tensions that can go up to 1000 kg, the teeth of the jaw indentations, which are generally of molded or injected plastic, do not sufficiently penetrate into the insulating sheath of the carrying cable of the conductor to assure its holding, because the constitutive material of the insulating sheath has a tendency to yield under the teeth of the jaws, permitting longitudinal sliding of the conductor.

SUMMARY OF THE INVENTION

This invention aims at remedying this drawback. For this purpose, in the clamp to which it relates and which is of the above-mentioned type, at least one longitudinal portion of the wall of the cavity of the control core provided for housing the carrying cable of the conductor and, preferably, each of the two diametrically opposite longitudinal portions of this cavity, consists of a metal bar inserted in this wall and whose free face is equipped with teeth.

Because of the penetration of the teeth of the metal bars in the wall of the insulating sheath of the carrying cable, this clamp is able to insure a very good holding of the conductor for whose anchoring it is used.

Preferably, each tooth of each metal bar is in the form of an isosceles triangular section with a straight free edge.

The two opposite bars of the same clamp can be arranged with their respective teeth either corresponding to or upside down to each other.

In case the core of the clamp consists of two prismatic jaws, the median part of the bottom of the indentation of each jaw consists of the toothing of a metal bar.

It is easy to see that the penetration of the teeth of the metal bars of the compressible core of the clamp increases the distance necessary for locking of the cable and this increase of the distance runs the risk of causing an exaggerated sag of the conductor.

To remedy this, according to another characteristic of the invention, the mooring element of the sleeve has a length adjustable to at least two different values. For example, if this element consists of a small cable, the latter is equipped with two tips for hooking onto the sleeve which are separated from one another by a length approximately equal to said increase of the locking distance of the control core of the clamp.

According to another advantageous characteristic of the invention, generally, the teeth of the bars of the control core go completely through the insulating sheath of the carrying cable and come in contact with it. Each toothed metal bar of the compressible central core of the clamp is connected by an electric conductor to an accessible terminal permitting its grounding.

This arrangement therefore greatly facilitates the often recommended grounding of the carrying cable of electric conductors.

BRIEF DESCRIPTION OF THE DRAWINGS

In any case, the invention will be understood from the following description with reference to the accompanying diagrammatic drawing representing, by way of nonlimiting example, an embodiment of an anchoring clamp according to the invention, in the case where this clamp is of the type whose sleeve has an approximately U-shaped cross section, while its compressible central core is made up of two prismatic jaws.

FIG. 1 is a view in perspective, slightly from below;

FIG. 2 is a view in cross section along II/II of FIG. 1;

FIG. 3 is a view in longitudinal section along III/III of FIG. 1;

FIG. 4 is a view in cross section similar to FIG. 2, after the carrying cable of the electric conductor has been put between its jaws.

DETAILED DESCRIPTION OF EMBODIMENTS

As the drawing shows, the anchoring clamp according to the invention of the type comprising a longitudinally split sleeve 2, having approximately a U-shaped cross section, delimiting a prismatic recess 3 whose inside faces 3a consisting of lateral wings 2a of sleeve 2 exhibit a slight longitudinal slope. The compressible central core, associated with sleeve 2 of this clamp is made up of two prismatic jaws 4 whose faces turned toward walls 3a of recess 3 of sleeve 2 exhibit a slight longitudinal slope complementary to that of walls 3a. In its face turned toward the other, each jaw 4 exhibits an indentation 4a intended to house carrying cable 5a of conductor 5 for whose anchoring this clamp is intended.

For this type of clamp, an electric conductor, or its possible carrying cable, is inserted between the jaws of the clamp. Making these jaws slide longitudinally in recess 3 of sleeve 2 causes them to approach one another and, consequently, causes the locking of the conductor or carrying cable housed between them. Naturally, the two jaws 4 comprise longitudinal connecting means, i.e., imposing on each of them longitudinal movements identical with those of the other. In the example illustrated in the drawing, these means are, in a way known in the art, made up of lateral projections 4b overlapping one another.

Carrying cable 5a of conductor 5 is surrounded, like conductor 5, with an insulating sheath 5b. Generally, insulating sheath 5b of carrying cable 5a, like that, moreover, of conductor 5, is of relatively flexible plastic so as not to create an obstacle to possible curves which the electric conductor must follow, both when it is stored and when it is put in place.

Generally, both sleeve 2 and jaws 4 of this type of clamp are made of rigid plastic and, particularly, of a thermoplastic resin such as polypropylene, i.e. a relatively yieldable material compared with hard metal.

Sleeve 2 of this clamp is obviously equipped with means for mooring to a bracket or the like and, in the example illustrated in the drawing, these mooring means consist of a small cable 6 whose one end 6a is irremovably fastened to sleeve 2, while its other end is equipped with a tip 6b which can be hooked removably, in a way known in the art, to sleeve 2.

As indicated above, because of the nature of the materials involved, even if the precaution is taken of notching the faces opposite indentations 4a of jaws 4, it is difficult to prevent conductor 5, and more particularly its carrying cable 5a, from sliding between jaws 4, particularly because of the possible yielding of the material of insulating sheath 5b in which plastic notches of indentations 4a of jaws 4 do not penetrate sufficiently.

To eliminate this drawback, in the clamp according to the invention, the median part of each indentation 4a consists of toothing 7a of a bar 7 formed of hard metal, a material less yieldable than the material of the jaw 4 and sleeve 2, fastened in jaw 4 considered, each tooth 7'a being intended to go through insulating sheath 5b of carrying cable 5a during locking of the clamp on this cable. To facilitate its penetration into insulating sheath 5b of carrying cable 5a, each tooth 7'a of toothing 7a of metal bar 7 has an isosceles triangular cross section and its free edge is straight. Thus the assurance is obtained that each tooth 7'a penetrates into insulating sheath 5b of carrying cable 5a until it is in contact with its metal core.

It can easily be seen that this penetration of teeth 7'a of toothing 7a of each bar 7 into insulating sheath 5b of this carrying cable 5a results in an increase of the longitudinal travel, necessary for locking the carrying cable 5a, of jaws 4 in sleeve 2 since this penetration obviously enables the two jaws 4 to come closer together. This additional travel is obviously performed to the detriment of the tension of conductor 5 and thereby allows an increase in the sag formed by this conductor between the anchoring clamp and its fastening point located immediately upstream. To mitigate this drawback by compensating for the undesirable effects of this additional travel, the anchoring means of sleeve 2 have a length adjustable to at least two different values, the greater one being used during placing of conductor 5 and the shorter one being used after this placing, to compensate for the additional travel of jaws 4 and to cancel the resulting sag of conductor 5.

In the example illustrated in the drawing, small cable 6 comprises, at its end moored removably to sleeve 2, a second tip 6'b which is distinct from tip 6b by a length approximately equal to this additional travel of jaws 4 in sleeve 2.

Penetration of teeth 7'a of toothing 7 of each metal bar 7 until its contact with the metal core of carrying cable 5 is advantageously used to ground this carrying cable 5a, as is often recommended. For this purpose, each metal bar 7 is connected to a terminal 8 carried by sleeve 2 by means of flexible electric conductor 9, this terminal 8 being readily connectable to a ground connector during hooking of this clamp to its bracket or the like, carried by the wall or the pole for which it is intended.

Each metal bar 7 advantageously is made of a metal hard enough to cut the insulating sheath 5b of carrying cable 5a but not hard enough to risk cutting its metal core. On the other hand, it is desirable that the metal constituting each metal bar 7 be relatively soft so that the free edge of each tooth 7a can fit, by deformation, the profile of the part of the metal core of carrying cable 5a with which it is in contact. Thus, a better electric connection is obtained between the metal core of carrying cable 5a and each metal bar 7, which is desirable for a better grounding of this carrying cable. For this reason, each metal bar 7 is advantageously made of aluminum.

In the example illustrated in the drawing, each metal bar 7 is fastened in the bottom of indentation 4a of jaw 4 which corresponds to it by simple engagement in a groove of the end turned toward the smallest cross section of this jaw, i.e., in the direction from which comes the traction exerted on the conductor for whose anchoring the clamp is used and closed.

In the example illustrated in the drawing and, particularly, in FIG. 3, metal bars 7 are positioned so that their respective teeth 7'a correspond. It is also possible to position bars 7 so that their respective teeth 7'a are placed upside down to one another.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. An anchoring clamp for an insulated electric conductor equipped with an insulated carrying cable comprising:
   a split sleeve formed of a material more yieldable than hard metal and provided with a mooring element and a conical recess with a slight slope;
   a compressible core formed of a material more yieldable than hard metal and mounted in said recess, said core including a cavity for housing the electric conductor or its carrying cable, said core having an outside shape complementary to the shape of said conical recess;
   said core capable of being wedged into said recess by sliding force;
   said cavity comprising a wall;
   said wall comprising at least one longitudinal wall portion comprising a bar formed of hard metal and inserted in said wall, the metal bar having a free face, said free face being equipped with teeth.

2. The anchoring clamp according to claim 1 wherein each tooth of the metal bar has the form of a section of an isosceles triangle.

3. The anchoring clamp according to claim 2 wherein each tooth on the metal bar has a free edge, and the free edge of each tooth is straight.

4. The anchoring clamp according to claim 1 wherein said split sleeve has an approximately U-shaped cross section;

said conical recess is prismatic with a slight longitudinal slope and a rectangular cross section;

said compressible core comprises two prismatic jaws which form wedges with a slope complementary to the slope of said recess, and each wedge exhibits, in its face turned toward the other, a notched indentation corresponding to approximately one half of the cavity provided for the conductor, said indentation having a bottom wherein the median part of the bottom of indentation of each jaw comprises said teeth of said metal bar.

5. The anchoring clamp of claim 4 wherein the metal bars are placed so that their teeth are located in corresponding relationship with each other.

6. The anchoring clamp of claim 1 wherein the teeth of each metal bar are placed so that they are in upside down relationship to one another.

7. The anchoring clamp of claim 1 wherein the mooring element of said sleeve has a length which is adjustable to at least two different values.

8. The anchoring clamp according to claim 7 wherein the mooring element of the sleeve comprises a small cable having a detachable end;

said detachable end of said cable is equipped with two tips for hooking on said sleeve;

the distance separating said two tips is approximately equal to the additional longitudinal travel of the jaws from the penetration of the teeth of the metal bars into the insulating sheath of said carrying cable.

9. The anchoring clamp according to claim 1 wherein each toothed metal bar of said compressible central core is connected by an electric conductor to an accessible terminal.

10. The anchoring clamp according to claim 1 wherein each metal bar is made of aluminum.

11. The anchoring clamp according to claim 1 wherein said split sleeve and compressible core are formed of plastic.

12. The anchoring clamp according to claim 11 wherein said plastic is a thermoplastic resin and each metal bar is made of aluminum.

* * * * *